United States Patent [19]

Sockwell et al.

[11] Patent Number: 4,830,436
[45] Date of Patent: May 16, 1989

[54] TRUCK BODY FOR RECYCLABLE MATERIALS

[76] Inventors: C. Leon Sockwell, P.O. Box 7726, Houston, Tex. 77270; John F. Kitterman; Kent B. Kitterman, both of 1720 S. First St., San Jose, Calif. 95112; Richard F. Koenig, P.O. Box 7726, Houston, Tex. 77270

[21] Appl. No.: 76,238

[22] Filed: Jul. 21, 1987

[51] Int. Cl.$^4$ ............................................. B60P 1/28
[52] U.S. Cl. ...................................... 298/8 R; 296/13; 296/56; 296/184; 298/18; 298/23 M
[58] Field of Search ...................... 298/8 R, 8 T, 17 R, 298/18, 22 R, 23 R, 23 M; 296/13, 32, 56, 184

[56] References Cited

U.S. PATENT DOCUMENTS

| | | | |
|---|---|---|---|
| 731,739 | 6/1903 | Bailey | 296/56 X |
| 1,619,628 | 3/1927 | Osborn | 296/13 X |
| 1,925,296 | 9/1933 | Barrett | 298/22 R |
| 2,929,658 | 3/1960 | Killebrew | 298/8 R |
| 3,236,562 | 2/1966 | Maxon | 298/18 X |
| 3,476,269 | 11/1969 | Baker et al. | |
| 4,242,953 | 1/1981 | St. Gelais | 298/8 R X |
| 4,470,747 | 9/1984 | Tichenor | 298/8 R X |

FOREIGN PATENT DOCUMENTS

| | | | |
|---|---|---|---|
| 800627 | 11/1950 | Fed. Rep. of Germany | |
| 512251 | 8/1939 | United Kingdom | 298/8 R |

OTHER PUBLICATIONS

Peerless Advertisment, Entitled "Multi Material Recycling Bodies", Dated Unknown.
Equipement Labrie Ltee, entitled "The Design—Durability Power Play—Recycling Truck and Body", Date Unknown.

Primary Examiner—Leslie J. Paperner
Attorney, Agent, or Firm—John S. Egbert

[57] ABSTRACT

A vehicle body having a frame, a pair of side dumpable compartments, and a rear dumpable compartment. Each of the side dumpable compartments is rotatably mounted to the frame such that the axis of rotation is parallel to the longitudinal axis of the vehicle body. Each of the side dumpable compartments has a well on the side of the compartment opposite the axis of rotation. A hydraulic actuator is disposed between the side dumpable compartment and the frame so as to cause the rotation and unloading of the side compartment. The rear dumpable compartment is rotatably connected to the frame such that the axis of rotation is transverse to the longitudinal axis of the vehicle body. This rear dumpable compartment has a tailgate that is selectably openable for permitting the dumping of material from the interior of this rear compartment. A hydraulic arm extends between the rear dumpable compartment and the frame so as to cause the rear dumpable compartment to rotate about its axis and to dump the materials.

18 Claims, 8 Drawing Sheets

FIG. 11

TRUCK BODY FOR RECYCLABLE MATERIALS

FIELD OF THE INVENTION

The present invention relates to bodies for attachment to the chassis of trucks. More particularly, the present invention relates to bodies suited for the hauling and dumping of materials, particularly recyclable materials.

BACKGROUND ART

Trucks in the service industry have a configuration in which a service body is mounted to cab chassis. In prior-art applications, the sevice body is attached rearward of the cab and directly onto the frame of the vehicle. The service body has a specially designed configuration which suits a particular purpose in various service industries.

The recycling of materials is a common activity in most major urban areas. The use of most metals does not destroy them. As commercial products, some metals are found in such large quantities in urban areas that their new concentration may exceed that which existed while they were in the ground. Cities, therefore, may be considered as ore deposits of certain minerals. As present, however, it is cheaper to mine new ores than to recycle used or waste metals, but this economic balance does not take into account the cost of disposing of the metallic waste that accumulates in urban regions. Thus, it is likely that, sometime in the future, many materials now considered as exhaustible, nonrenewable resources will be treated as recyclable resources. Such commonly available metals may be found in food or drink cans that are commonly disposed of at the present. In addition, waste glass and paper can be suitably converted by recycling processes.

In all recycling programs, it is important to keep the glass separate from the metal, the metal separate from the paper, and the paper separate from the glass. If trucks are used for the transportation of recyclable products, then three trucks must be utilized to transport the three different and main types of recyclable materials. If the recycling trucks are used for the gathering of the recyclable materials, then a more difficult management problem arises. The recyclable materials may be loaded in all three forms, into a single bin, and then separated for further recycling transportation. Alternatively, three separate bins must be transported so that the material may be sorted as it is accumulated.

In the management of recycling efforts, it is important to minimize manpower, facilities, and transportation vehicles. It is also important to maximize the ability to load the vehicle and to minimize the efforts to unload the vehicle.

Many pickup truck-style loading vehicles have a relatively high side wall which makes loading difficult for those persons of small stature. A worker must raise the load over the edge of the vehicle storage bin in order to drop the material into the bin.

Another problem that confronts recycling efforts is the inability to maximize the space available for the recycling materials. Typically, the floor of the truck bed will be the lower limit for the ability to receive material. It is desirable to maximize the space available for the reception of recyclable materials.

It is an object of the present invention to provide a truck service body which maximizes the space available for the reception of materials.

It is another object of the present invention to provide a truck service body that increases the ability to quickly unload the materials from the separate material compartments.

It is a further object of the present invention to provide a truck service body that provides separate loading bins for the segregation of the three main types of recyclable materials.

It is still a further object of the present invention to provide a truck service body that increases the ease of manufacture, decreases the cost of manufacture, and simplifies the hydraulic unloading mechanisms.

It is still another object of the present invention to provide a recycle service body that can be conveniently used by persons of small stature.

These and other objects and advantages of the present invention will become apparent from a reading of the attached specification and appended claims.

SUMMARY OF THE INVENTION

The present invention is a recycle service body comprising a frame, a pair of side dumpable compartments, and a rear dumpable compartment. The side dumpable compartments are rotatably mounted to the frame such that the axis of rotation is parallel to the longitudinal axis of the vehicle body. The side dumpable compartment has a well on the side of the dumpable compartment opposite the axis of rotation. Each of these side dumpable compartments is arranged adjacent to each other and independently actuable. The rear dumpable compartment is rotatably connected to the frame such that the axis is transverse to the longitudinal axis of the vehicle body. This rear dumpable compartment has a tailgate selectively openable for permitting the passage of material from the interior of this rear dumpable compartment.

A hydraulic actuator is connected to the side and rear dumpable compartments for enabling these compartments to assume a first, material retention, position and a second, material dumping, position.

The side dumpable compartment comprises a storage bin, a frame section, and a hydraulic cylinder. The storage bin has a pivot member attached to the exterior surface of the storage bin. The frame section has a pivot arm extending upwardly and is configured for fixed attachment to the chassis of a truck. The hydraulic cylinder is attached at one end of the frame section and at the other end of the storage bin. This hydraulic cylinder allows the storage bin to rotate about the junction of the pivot member and the pivot arm. The storage bin has a well on the side of the bin opposite the pivot member. This well extend downwardly beneath the position of the frame section. The well has three vertical walls and a fourth wall extending outwardly toward the pivot member. The storage bin has three vertical walls and a fourth outwardly angled wall. The pivot members are attached to this fourth wall.

The storage bin of the side dumpable compartment has a first gate hinged to the exterior wall of the storage bin opposite the pivot member and a second gate hinged to the wall of the storage bin to which the pivot member is attached. The first and second gates have lock members for selectably raising and lowering the gates. This lock member is suitable for maintaining the first and second gates in a closed position aligned with the top edge of the storage bin.

The rear dumpable compartment comprises a storage volume, a framework, and a hydraulic arm. The storage volume is formed by the exterior walls of the rear dumpable compartment. The framework has a pivot point arranged thereabout. This framework is attached to the storage volume. The framework has a portion suitable for fixed attachment to the chassis of a truck. The storage volume is rotated about the pivot point. The hydraulic arm is connected to the framework at one end and to the storage volume at the other end. This hydraulic arm is suitable for causing upward and downward rotation of the storage volume about the pivot point.

The storage volume comprises a wheel well indentation formed and extending inwardly of the storage volume. This wheel well indentation is for accommodating the wheels of a truck. The storage volume further comprises a sunken well formed between the wheel well indentation and the tailgate. The sunken well extends downwardly below the level of the framework. A hydraulic arm indentation is formed and extends angularly inwardly of the storage volume. This hydraulic arm indentation is for accommodating the range of motion of the hydraulic arm during the rotation of the storage volume about the pivot point.

This rear dumpable compartment further has first and second gate members attached by hinges to the exterior walls at the sides of the storage volume. These lock members are suitable for maintaining the first and second gate members in a closed position aligned with the top edge of the storage bin.

The rear dumpable compartment has, importantly, a tailgate that comprises a first panel, a second panel, and a latching mechanism. The first panel is rotatably connected at the top to the storage volume. This first panel extends across the rear of the storage volume. The panel is flexibly connected to the bottom of the first panel. This second panel extends across the rear of the storage volume. The latching mechanism is attached to the second panel for selectably fastening the tailgate to the rear of the storage volume. A hydraulic actuator is connected at one end of the first panel and at the other end of the second panel. This hydraulic actuator causes the second panel to rotate toward the first panel. The hydraulic actuator is connected to the latching mechanism on the second panel. The hydraulic actuator causes the latching mechanism to unlock the tailgate from the rear of the storage volume.

The latching mechanism comprises first and second receptacles, a first bar, a second bar, and a hydraulic actuator. The first and second receptacles are fastened to the sides of the rear of the storage volume separate from the first and second panels. The first bar extends across a portion of the exterior surface of the second panel. The second bar extends across a portion of the exterior surface of the second panel. These first and second bars are aligned so as to slidably engage the first and second receptacles. The hydraulic actuator is fastened at one end to the junction of the first and second bars. The first and second bars are flexibly attached to each other at one end. The hydraulic actuator causes the angle between the first and second bars to change so as to enable the first and second bars to engage the receptacles or to become removed from the receptacles.

DETAILED DESCRIPTION OF THE INVENTION

Figure 1:
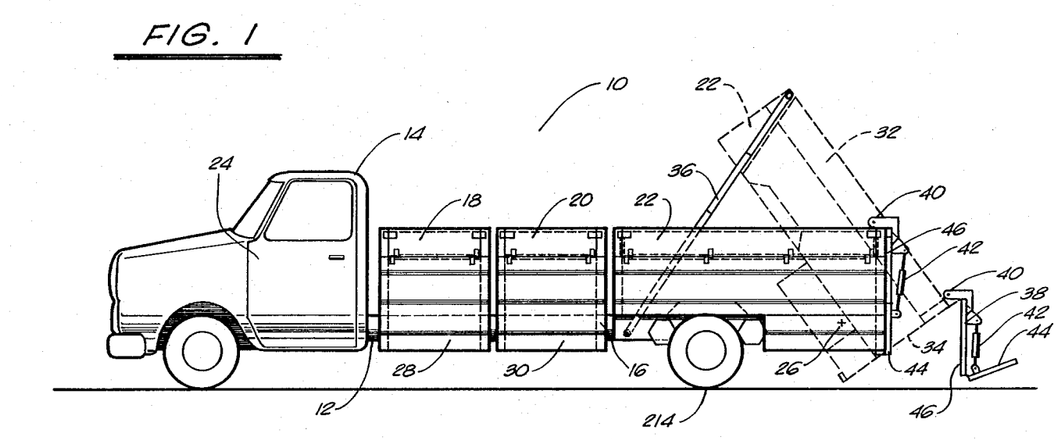
FIG. 1 shows a cross-sectional view in side elevation of the recycle service body of the present invention as attached to a truck chassis.

Referring to FIG. 1, there is shown a view of the recycle service body 10 as attached to chassis 12 of truck 14. Recycle service body 10 includes a frame 16, first side dumpable compartment 18, second side dumpable compartment 20, and rear dumpable compartment 22. As can be seen in FIG. 1, first side dumpable compartment 18 is fastened to the chassis 12 immediately behind cab 24 of truck 14. Second side dumpable compartment 22 is fastened to chassis 12 behind first side dumpable compartment 18 and before rear dumpable compartment 22. The rear dumpable compartment 22 is mounted to the rearmost portion of the chassis 12 and is rotatably mounted at point 26 to the chassis 12.

First side dumpable compartment 18 has a well 28, suitable for receiving material, which extends below the level of the chassis 12 of truck 14. Similarly, second side dumpable compartment 20 has a well 30 located in a similar position. The side dumpable compartments 18 and 20 are independently actuable and separate from each other. Each of these side dumpable compartments 18 and 20 have an identical configuration and operate in a similar manner.

Rear dumpable compartment 22 is movable between the positions illustrated in FIG. 1. Second position 32 is suitable for the dumping of materials through the end 34 of the rear dumpable compartment 22. A hydraulic arm 36 serves to move the rear dumpable compartment 22 between the two positions. A tailgate 38 is rotatably mounted at point 40 to the rear dumpable compartment 22. A latching mechanism 42 causes a second panel 44 to rotate toward first panel 46 and to allow the tailgate 38 to become unlatched from the end 34 of rear dumpable compartment 22.

In the configuration of FIG. 1, the recycle service body 10 should carry glass in the first side dumpable compartment 18, aluminum in the second side dumpable compartment 20, and paper in the rear dumpable compartment 22. The side dumpable compartments 18 and 20 have a configuration suitable for receiving four cubic yards of material. The arrangement of the separate compartments allows the materials to be properly segregated and to be distributed for proper balance and weight distribution.

Typically, the recycle service body 10 will be manufactured from steel. However, under certain circumstances, the recycle service body may be constructed from aluminum material or fiberglass. The material used to construct the recycle service body 10 is not to be constructed as a limitation on the present invention.

Figure 2:
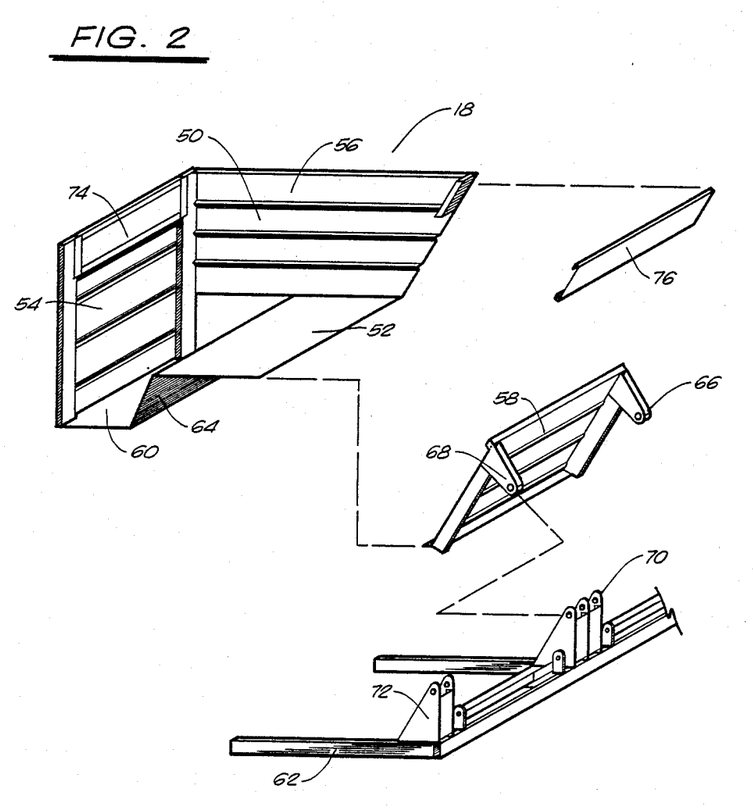
FIG. 2 is an exploded view showing the configuration of a side compartment of the vehicle body of FIG. 1.

FIG. 2 shows an exploded view of the side dumpable compartment 18. Side dumpable compartment 18 comprises a storage bin 50. Storage bin 50 has a floor 52, vertical side wall 54, vertical forward wall 56, another vertical end wall (not shown), and an outwardly the angled side wall 58. Storage bin 50 has a well 60 on the side of the bin opposite outwardly angled wall 58. This well 60 extends downwardly beneath the position of the frame 62. Well 60 has a generally flat and horizontal bottom surface. Well 60 also has a wall 64 angled outwardly toward the wall 58 of the storage bin 50. This angled configuration of the well wall 64 provides a proper configuration for the unloading of material. In particular, wall 64 enhances the ability of the material contained within the bin 50 to be properly unloaded. Material will gently drift down the angled surface of wall 64.

Wall 58 has pivot members 66 and 68 attached to the exterior surface of wall 58 of storage bin 50. Frame section 62 has pivot arms 70 and 72 which extend upwardly from frame section 62. Frame section 62 is configured for allowing fixed attachment to the chassis 12 of the truck 14. As can be seen in FIG. 2, pivot member 66 engages pivot arm 70 and pivot member 68 engages pivot arm 72. A hydraulic cylinder (not shown) is attached so as to allow the rotatable movement about the junction of these pivot members 66 and 68 with pivot arms 70 and 72.

In FIG. 2, vertical wall 54 has a first gate 74 hinged to the wall 54. First gate 74 is located on the opposite side of the storage bin from the pivot members 66 and 68. Additionally, a second gate 76 is hinged to the outwardly angled wall 58. These hinged gates allow the level of the storage bin walls to be reduced and placed in more convenient location for the purposes of loading the recyclable material into the recycle truck body.

Figure 3:
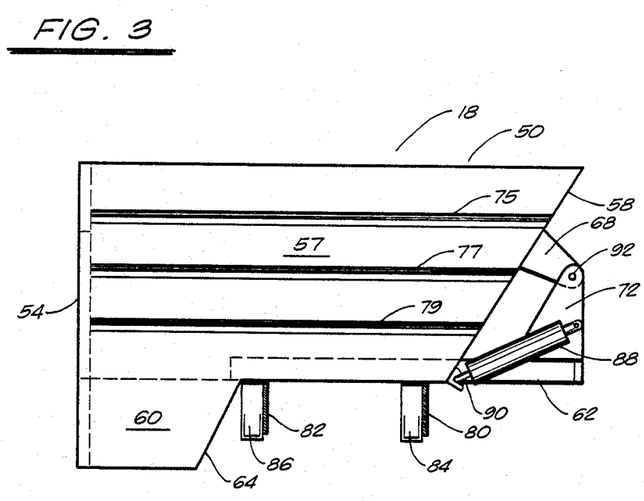
FIG. 3 is an isolated end view of the side compartment of the recycle service body of FIG. 1.

FIG. 3 shows an isolated end view of the side dumpable compartment 18 of the present invention. In particular, FIG. 3 shows the assembled configuration of that of FIG. 2. In FIG. 3, the previously omitted wall 57 is illustrated. Corrugations 75, 77, and 79 are formed on the surface of wall 57. These corrugations 75, 77, and 79 add strength to the storage bin 50. Pivot member 68 is shown as extending outwardly on angled wall 58. Pivot member 68 engages pivot arm 72 of frame 62. In FIG. 3, the attachment sections 80 and 82 of frame section 62 are shown as extending downwardly from the frame section 62. Plates 80 and 82 may be fixedly attached to the chassis components 84 and 86 of truck 14. These plates may be affixed by standard methods such as bolting, welding, or other means.

A hydraulic cylinder 88 is shown as extending between pivot arm 72 and the lowermost edge of wall 58 of storage bin 50. There are two hydraulic cylinders 88 adapted so as to act on each of the side dumpable compartments 18 and 20. FIG. 3 shows the hydraulic cylinder 88 in its compressed condition. When it is desired to unload the material within storage bin 50, the hydraulic cylinder 88 will be actuated causing the piston rod 90 to move so as to cause the storage bin 50 to rotate about the junction point 92 until the storage bin 50 will be in a position in which the contents will fall gracefully from the interior of storage bin 50 onto a desired location at the side of the truck 14.

Figure 4:
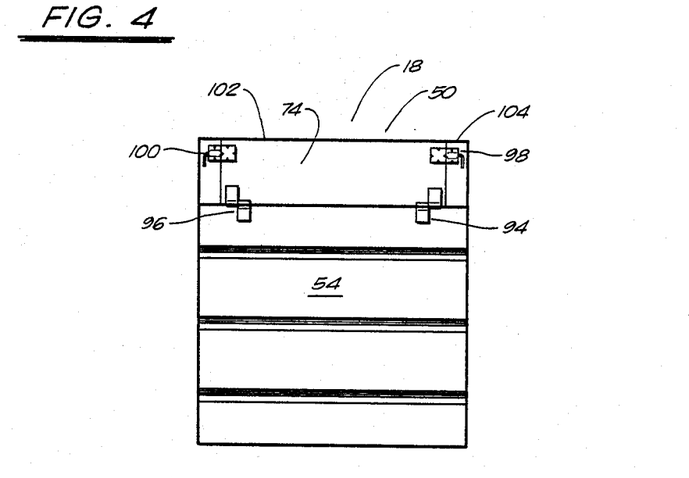
FIG. 4 is an isolated side view of the side compartment of the recycle service body of FIG. 1.

FIG. 4 is an isolated side view of the first side dumping compartment 18. In particularly, this is a close-up illustration of wall 54. As can be seen, first gate 74 is particular illustrated. During times of transportation of loads within bin 50, the gate 74 will be in the raised and closed position as illustrated in FIG. 4. Gate 74 is attached to the main body of wall 54 by hinges 94 and 96. Lock members 98 and 100 are positioned on the exterior of wall 54 so as to allow for the selective raising (closing) or lowering (opening) of gate 74. Lock members 98 and 100 are simple latch-type locks that can be manually opened or closed by those loading the vehicle with recyclable materials. In the raised (or closed) position, the top edge 102 of gate 74 is aligned with the top edge 104 of wall 54 and bin 50.

Figure 5:
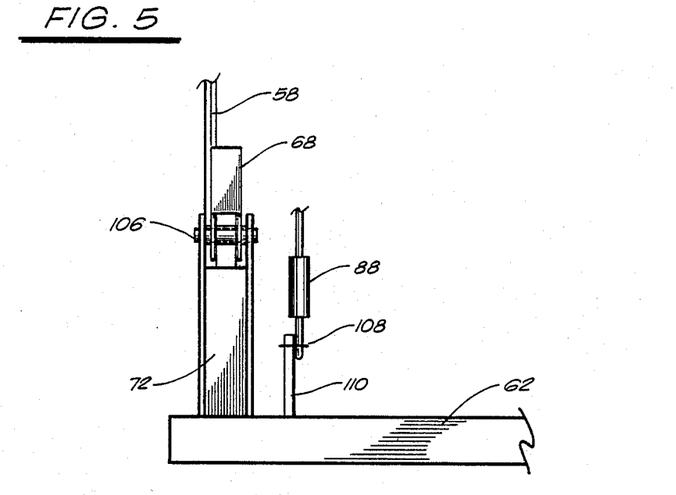
FIG. 5 is a close-up view of the pivot points and rotation mechanism of the side compartment of the present invention.

FIG. 5 shows a closeup view of the rotation mechanism illustrated in FIG. 3. In particular, this view is taken from the side of the recycle service body opposite that illustrated in FIG. 4. In FIG. 5, pivot arm 72 is rigidly affixed to frame section 62. Pivot member 68 is rotatably mounted to this pivot arm 72 by pivot pin 106. Hydraulic cylinder 88 is fixedly attached by pin 108 to a plate 110.

Figure 6:
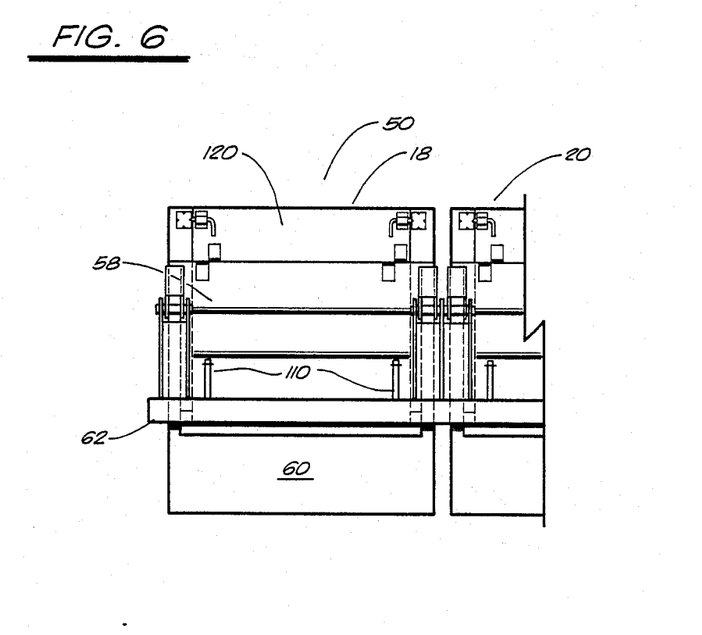
FIG. 6 is an isolated side view of the opposite side of the side compartment from that shown in FIG. 4.

FIG. 6 is an expanded view taken along the side of the vehicle and shown in connection with FIG. 5. In particular, this is a view taken of the angled wall 58 of the first dumpable compartment 18. A portion of the view of the second dumpable compartment 20 is also illustrated in FIG. 6. This view shows the well 60 extending deeply below the frame section 62. Wall 58 has a hinged gate 120 attached to wall 58. Hinged gate 120 is of a similar style and configuration as that of the gate 74 (illustrated in FIG. 4). The locking mechanism serves the same function and purpose as that illustrated in FIG. 4. A pair of hydraulic cylinders are attached to the plates 110. For the purposes of the proper lifting and rotation of the storage bin 50, it has been found desirable to have a pair of hydraulic cylinders which serve the lifting purpose. When the hydraulic cylinders (not shown) are actuated, the storage bin 50 will be rotated toward the viewer of FIG. 6 so that the load within storage bin 50 is dumped from the bin.

Figure 7:
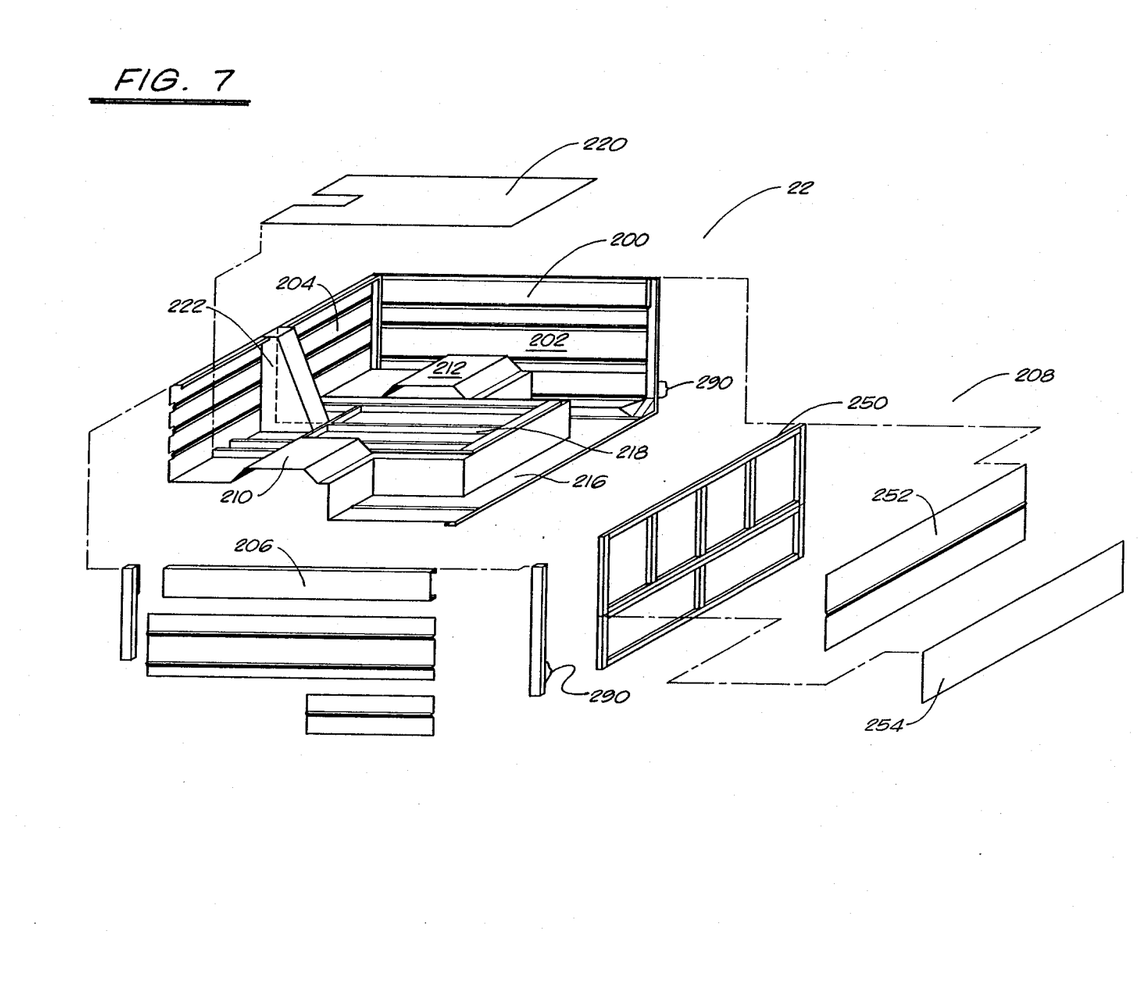
FIG. 7 is an exploded view of the rear compartment of the recycle service body of the present invention.

FIG. 7 is an exploded view showing the rear dumpable compartment 22. Rear dumpable compartment 22 has a storage volume 200 that is formed by the exterior walls 202, 204, and 206. The storage volume 200 is further defined by the addition of the tailgate section 208. Walls 202, 204, and 206 are generally vertical walls. Similarly, tailgate 208 will have a vertical configuration when the storage volume 200 is in its lowered position.

Storage volume 200 has wheel well indentations 210 and 212. Wheel well indentations 210 and 212 are formed and extend inwardly into the storage volume. These wheel well indentations 210 and 212 serve to accommodate the wheels 214 (shown in FIG. 4) of truck 14. A sunken well 216 is formed between the wheel well indentations 210 and 212 and the tailgate 208. The sunken well 216 extends downwardly below the framework 218 of the rear dumpable compartment 22. A floor 220 serves to cover and add extra storage volume to the area occupied by the framework 218. A hydraulic arm indentation 222 is formed and extends angularly inwardly into the storage volume 200. This hydraulic arm indentation serves to accommodate the range of motion of the hydraulic arm 36 during the rotation of the storage volume 200 about the pivot point 26. Framework 218 is fixedly attached, in one position, to the chassis 12 of truck 18. Framework 218 also has a portion rotatably connected to the storage volume 200. A suitable pivot mechanism allows the storage volume 200 to be rotated during the actuation of the hydraulic arm 36. Hydraulic arm 36 is telescoping double-acting hydraulic cylinders that has an suitable extended distance for allowing material to slide through the storage volume 200 and outwardly through the tailgate 208. This "double-action" means that hydraulic arm 36 provides hydraulic power during both the up and down movement of the storage volume 200.

Figure 8:
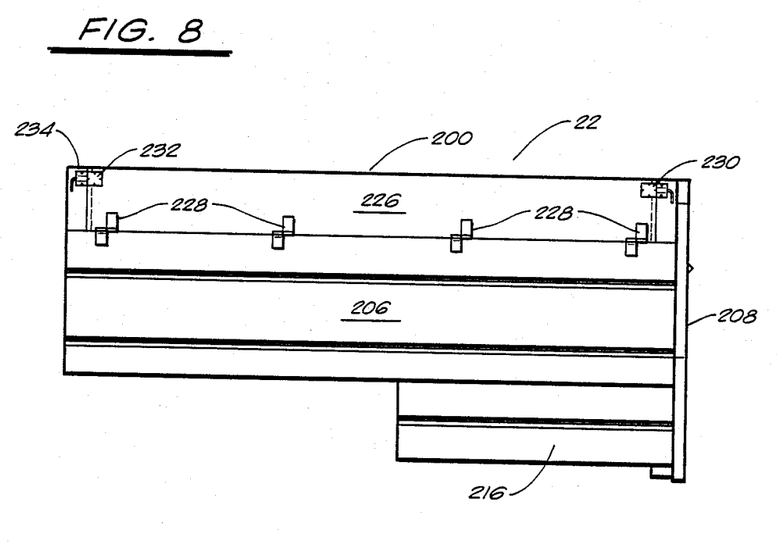
FIG. 8 is an isolated side view of the rear compartment of the recycle service body of the present invention.

FIG. 8 is a side view of the rear dumpable compartment 22. FIG. 8 illustrates the sunken well 216, the tailgate 208, and the vertical side wall 206. Importantly, FIG. 8 illustrates the gate member 226. Gate member 226 is attached by hinges 228 to the side vertical wall 206. It should be noted that wall 202 will have a similar style of gate 226. Gate 226 has a pair of lock members 230 and 232. These lock members 230 and 232 are configured for selectively raising (or closing) and lowering (or opening) the gate 226. When closed, locks 230 and 232 will maintain gate 226 in alignment with the top edge 234 of wall 206 of storage volume 200.

Figure 9:
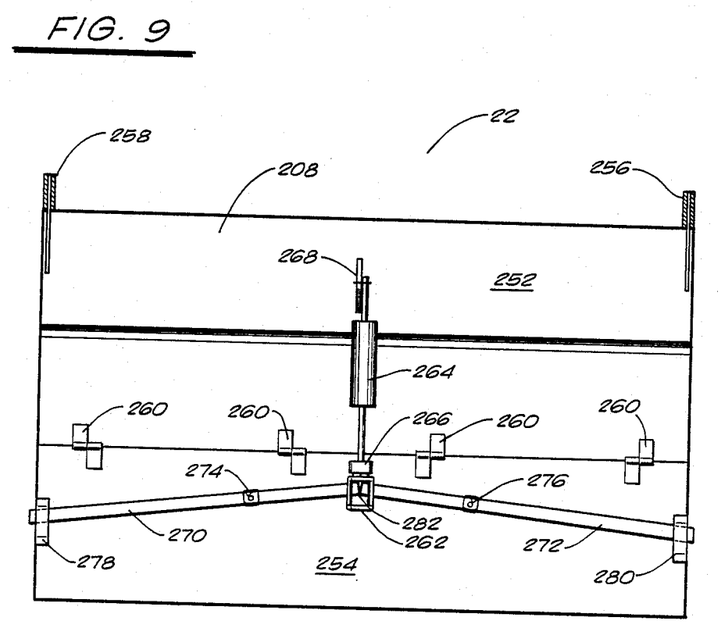
FIG. 9 is an end view of the recycle service body of the present invention.

FIG. 9 is an end view of the rear dumpable compartment 22 and is a view of the details of tailgate 208. With reference to FIG. 7, tailgate 208 comprises structural frame 250 which receives the first panel 252 and the second panel 254. First panel 252 is rotatably connected by pivoting mechanisms 256 and 258 to the body of storage volume 200. First panel 252 extends across the rear of the storage volume 200 so as to close the area of the storage volume 200 adjacent first panel 252. Second panel 254 is flexibly connected by hinges 260 to the bottom of first panel 252. Second panel 254 similarly extends across the rearward and lower portion of the storage volume 200. Latching mechanism 262 is attached to the second panel 254 for selectively fastening the tailgate to the rear of the storage volume 200. A hydraulic actuator 264 is connected at end 266 to latching mechanism 262 and at the other end to plate 268 extending outwardly from first panel 252. FIG. 9 illustrates the hydraulic actuator 264 in its expanded and extended position. When expanded, hydraulic actuator 264 will allow the first panel 252 and the second panel 254 to assume a generally flat vertical configuration. Hydraulic actuator 264 causes the latching mechanism 262 to unlock the tailgate 208 from the rearward portion of the storage volume 200.

Latching mechanism 262 comprises a first bar 270 and a second bar 272. First bar 270 extends across a portion of the exterior surface of the second panel 254. The second bar 272 extends across a portion of the exterior surface of the second panel 254. Hinges 274 and 276 are attached along bars 270 and 272, respectively, to assist in the movement of these bars and to assist in the mechanism of the latching operation. Guides 278 and 280 direct the movement of the bars during the latching operation. Hydraulic cylinder 264 is fastened at one end to the junction of the first bar 270 and the second bar 272. The first bar 270 and the second bar 272 are flexibly attached to each other at point 282. The hydraulic actuator 262 causes the angle between the first bar 270 and the second bar 272 to change so as to cause the bars 270 and 272 to move inwardly or outwardly. As bars 270 and 272 move outwardly, they engage receptacles 290 located at the back edges of the sides of the storage volume 200.

Figure 10:
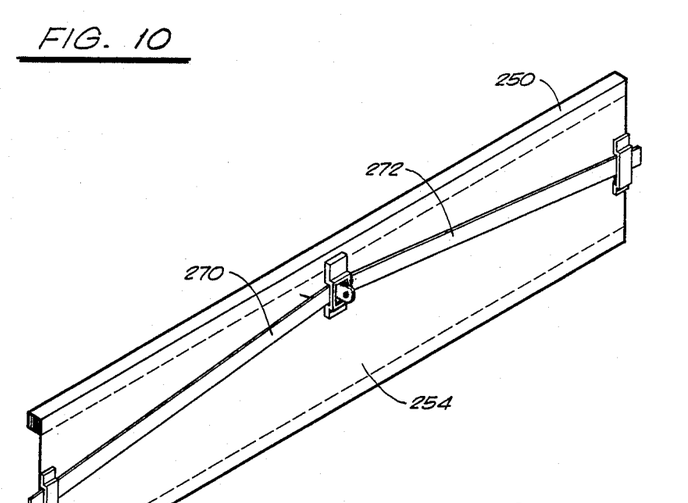
FIG. 10 is a perspective view showing the latching mechanism of the present invention.

FIG. 10 is a perspective view showing the latching mechanism illustrated in FIG. 9. The structural frame 250 of the second plate 254 is shown.

Figure 11:
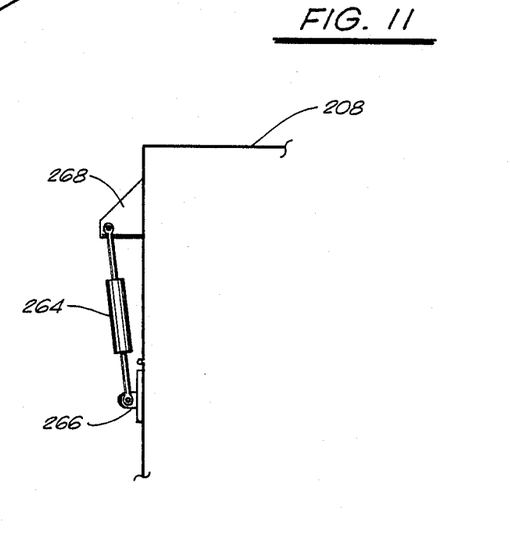
FIG. 11 is a side view showing the tailgate mechanism of the present invention.

FIG. 11 is a side view of the tailgate 208 of the present invention. In particular, plate 268 and latching mechanism 266 are illustrated. FIG. 11 also shows the verticality and flatness of the tailgate 208 when the hydraulic actuator 264 is in its expanded position.

It should be noted that the rear dumpable compartment 22 could be, alternatively, a pair of independently actuable compartments. For example, if it were desirable to carry four different types of recyclabe materials, then it would be desirable to have a pair of rear dumpable compartments. Each of these rear dumpable compartments would have a hydraulic arm 36. Each of these compartments would have a wall extending longitudinally vertically though the storage volume 200. As a result, each of these rear dumpable compartments would have a volume approximately half of the volume of the single rear compartment illustrated in the preferred embodiment of the present invention.

In operation, when it is desired to unload the rear dumpable compartment 22, the driver of the truck 14 will actuate the proper hydraulics. Initially, the hydraulic actuator 264 will cause the tailgate 208 to become unlatched from the storage volume 200. Secondly, the hydraulic arm 36 will gently and slowly cause the rear dumpable compartment 22 to rotate about the pivot axis 26. To prevent damage to the panels of the tailgate, hydraulic actuator 264 will cause the second panel 254 to be rotated toward the first panel 252 (as shown in FIG. 1). If this hydraulic action did not take place, then it is possible that the tailgate would become damaged by collision with the earth 290. In the meantime, the tailgate 208 will rotate about the pivoting mechanisms 256 and 258 so as to open the rearward portion of the storage volume. In its fully extended position, hydraulic arm 36 will tilt the rear dumpable compartment 22 in position so as to allow the recyclable paper to be disposed outwardly therefrom.

When dumping is completed, hydraulic arm 36 will lower the rear compartment 22, and hydraulic actuator 264 will level first panel 252 and second panel 254. When the lowering is completed, the fully extended hydraulic actuator 264 will cause the bars 270 and 272 to engage the receptacles 290 of the storage volume 200. The rear dumpable compartment 22 will then be ready to receive additional loads.

The present invention offer significant advantages over the prior art of recycle service bodies. First, the present invention offers three distinct and segregated compartments. These can be utilized to receive and to separate glass, cans, and paper. Each of these compartments is separately dumpable so that the load can be dumped whenever and wherever needed. There is no need to sort one load from the other prior to dumping.

It is an additional advantage of the present invention that the present invention maximizes the use of space within the storage compartments. This is enhanced by the use of the wells which extend below the frame of the vehicle. These wells maximize the use of available space. The gates on each of the storage compartments allow the lifting level to be significantly reduced. If the personnel involved in the recycling operation are of short stature, then the unlatching of the gates on each of the storage compartments will allow the short statured person to conveniently load each of these storage compartments. There is no need to have these people injure themselves by attempting to lift the loads to an excessively high level.

The tailgate configuration of the present invention maximizes the amount of load that can be contained in the rear compartment. The tailgate can be utilized, in economic fashion, in a manner that allows the load to be easily removed from the rear compartment. This eliminates the need for the excessively long (and expensive) telescoping hydraulic jack. The use of the tailgate also allows for the better balanced dumping operation.

The foregoing disclosure and description of the invention is illustrative and explanatory thereof, and various changes in the details of the illustrated apparatus may be made within the scope of the appended claims without departing from the true spirit of the invention. The embodiment shown above is illustrative only and is not intended to limit the scope of the present invention. The present invention should be interpreted only according to the appended claims and their legal equivalents.

We claim:

1. A truck body for the transportation of recyclable articles comprising:
   frame means;
   a side dumpable compartment means rotatably mounted to said frame means such that the axis of rotation of said side dumpable compartment means is parallel to the longitudinal axis of said truck body, said side dumpable compartment means having a well on the side of said side dumpable compartment means opposite said axis of rotation: and
   a rear dumpable compartment means positioned rearward of said side dumpable compartment means, said rear dumpable compartment means attached independently to said frame means, said rear dumpable compartment means rotatably mounted to said frame such that the axis of rotation is transverse to the longitudinal axis of said truck body, said rear dumpable compartment means having a tailgate selectively operable for permitting the passage of material from the interior of said rear dumpable compartment means, said tailgate comprising:
   a first panel rotatably connected to said storage volume, said first panel extending across the rear of said storage volume:
   a second panel flexibly connected to the bottom of said first panel, said second panel extending across the rear of said storage volume: and
   latching means attached to said second panel for selectively fastening said tailgate to the rear of said storage volume.

2. The truck body of claim 1, said side dumpable compartment means comprising:
   a first dumpable compartment connected to the forward portion of said frame means; and
   a second dumpable compartment interposed between said first dumpable compartment and said rear dumpable compartment means, said first and second dumpable compartments being independently actuable.

3. The truck body of claim 1, further comprising:
   hydraulic actuation means connected to said side and rear dumpable compartment means and to said frame means for enabling said side and rear dumpable compartment means to move from a material retaining position to a material unloading position.

4. The truck body of claim 1, said side dumpable compartment means comprising:
   a storage bin having a pivot member attached to the exterior surface of said storage bin;
   a frame section having a pivot arm extending upwardly therefrom, said frame section configured for fixed attachment to the chassis of a truck; and
   a hydraulic cylinder attached at one end to said frame section and to the other end to said storage bin, said hydraulic cylinder for causing said storage bin to rotate about the junction of said pivot member and said pivot arm.

5. The truck body of claim 4, said storage bin having said well on the side of said bin opposite said pivot member, said well extending downwardly beneath the position of said frame section.

6. The truck body of claim 5, said well having three walls extending upwardly perpendicularly, said well having a fourth wall angled outwardly toward said pivot member.

7. The truck body of claim 4, said storage bin having three perpendicular walls and a fourth wall angled outwardly, said fourth wall having said pivot member attached to the exterior surface.

8. The truck body of claim 4, said storage bin further comprising:
   a first gate hinged to an exterior wall of said storage bin opposite said pivot member; and
   a second gate hinged to the wall of said storage bin to which said pivot member is attached.

9. The truck body of claim 8, said first and second gates having lock members for selectively raising and lowering said gates, said lock members suitable for maintaining said first and second gates in a closed position aligned with the top edge of said storage bin.

10. The truck body of claim 1, said rear dumpable compartment means comprising:
    a storage volume formed by the exterior walls of said rear dumpable compartment means;
    a framework having a pivot point arranged thereabout, said framework attached to said storage volume, said framework having a portion suitable for fixed attachment to the chassis of a truck, said storage volume rotatable about said pivot point; and
    a hydraulic arm connected to said framework at one end and to said storage volume at the other end, said hydraulic arm suitable for causing upward and downward rotation of said storage volume about said pivot point.

11. The truck body of claim 10, said storage volume comprising:
    a wheel well indentation formed and extending inwardly of said storage volume, said wheel well indentation for accommodating the wheels of a truck; and
    a sunken well formed between said wheel well indentation and said tailgate, said sunken well extending downwardly below said framework.

12. The truck body of claim 11, further comprising:
    a hydraulic arm indentation formed and extending angularly inwardly of said storage volume, said hydraulic arm indentation for accommodating the range of motion of said hydraulic arm during the rotation of said storage bin about said pivot point.

13. The truck body of claim 10, said exterior walls of said storage volume extending upwardly perpendicular to the floor of said storage volume.

14. The truck body of claim 10, further comprising: first and second gate members attached by hinges to the exterior walls at the sides of said storage volume.

15. The truck body of claim 14, said first and second gate members having lock members for selectively raising and lowering said gate members, said lock members suitable for maintaining said first and second gate members in a closed position aligned with the top edge of said storage volume.

16. The truck body of claim 1, further comprising: a hydraulic actuator connected at one end to said first panel and at the other end to said second panel, said hydraulic actuator for causing said second panel to rotate toward said first panel.

17. The truck body of claim 16, said hydraulic actuator connected to said latching means on said second panel, said hydraulic actuator for causing said latching means to unlock said tailgate from the rear of said storage volume.

18. The truck body of claim 1, said latching means comprising:
first and second receptacles fastened to opposite sides of the rear of said storage volume separate from said first and second panels;
a first bar extending across a portion of the exterior surface of said second panel;
a second bar extending across a portion of the exterior surface of said second panel, said first and second bars aligned so as to slidably engage said first and second receptacles; and
a hydraulic actuator fastened at one end to the junction of said first and second bars, said first and second bars flexibly attached to each other at one end, said hydraulic actuator causing the angle between said first and second bars to change so as to enable said first and second bars to engage said receptacles.

* * * * *